United States Patent

[11] 3,624,113

| [72] | Inventors | Alberto Ercoli<br>Milan;<br>Rinaldo Gardi, Carate Brianza (Milan);<br>Romano Vitali, Casatenova (Como), all of Italy |
|---|---|---|
| [21] | Appl. No. | 884,008 |
| [22] | Filed | Dec. 10, 1969 |
| [45] | Patented | Nov. 30, 1971 |
| [73] | Assignee | Warner-Lambert Company<br>Morris Plains, N.J. |
| [32] | Priority | Dec. 11, 1968 |
| [33] | | Italy |
| [31] | | 24887 A/68 |

[54] LONG-ACTING ESTRADIOL DERIVATIVES
5 Claims, No Drawings

[52] U.S. Cl. .................................................. 260/397.5, 260/999
[51] Int. Cl. ..................................................... C07c 169/08

[50] Field of Search ............................................ 260/397.5,
Machine Searched Steroids

[56] References Cited
UNITED STATES PATENTS

| 3,135,744 | 6/1964 | Ercoli et al. .................. | 260/239.55 |
| 3,242,198 | 3/1966 | Ercoli et al. .................. | 260/397.4 |
| 3,417,183 | 12/1968 | Ercoli et al. .................. | 424/243 |

*Primary Examiner*—Henry A. French
*Attorneys*—Albert H. Graddis, Henry E. Millson, Jr. and Frank S. Chow

ABSTRACT: $C_7$–$C_{12}$ and $C_{15}$–17-cycloalkenyl ethers of estradiol-3-alkanoyl ester having contraceptive and estrogenic activity are obtained by reacting estradiol-3-alkanoyl-ester with a functional derivative of a cyclic ketone at a temperature higher than 70° C.

LONG-ACTING ESTRADIOL DERIVATIVES

This invention relates to novel long-acting steroids of the estrogenic series. More particularly, this invention relates to $C_7$—$C_{12}$ 17-cycloalkenyl ethers of estradiol 3-esters and to novel compositions having prolonged contraceptive and estrogenic activity containing said $C_7$—$C_{12}$ 17-cycloalkenyl ethers of estradiol 3-esters, as active ingredients.

17-Esters of estradiol 3-esters, particularly the 17(1'-cycloalkenyl) ethers having five or six carbon atoms in the cycloaliphatic ring have been described as having enhanced oral uterotrophic activity (see for example British Pat. No. 1,072,828).

It has surprisingly been found now that $C_7$—$C_{12}$ 17-(1'-cycloalkenyl) ethers of estradiol 3-esters in which the cycloalkenyl ring in 17-position contains up to 12 carbon atoms exhibit an enhanced and protracted estrogenic activity and a marked contraceptive action.

So, this invention provides a new series of 17-(1'-cycloalkenyl) ethers of estradiol 3-esters characterized by the following general formula:

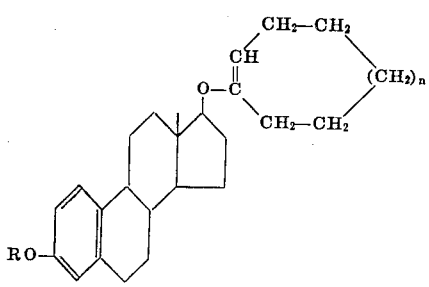

I wherein R is selected from the group consisting of an unsubstituted straight or branched chain alkanoyl, a phenylalkanoyl and cycloalkylalkanoyl group containing up to 10 carbon atoms and n is an integer of from one to six inclusive.

Typical examples of the above esters are: acetyl, propionyl, butyryl, isobutyryl, valeryl, isovaleryl, trimethylacetyl, caproyl, enathoyl, capryloyl, phenylacetyl, α-phenylpropionyl, β-phenylpropionyl, α-phenylbutyryl, β-phenylbutyryl, cyclopentylacetyl, cyclohexylacetyl, α-cyclopentylpropionyl, β-cyclopentylpropionyl and the like.

A further scope of the present invention is to disclose the compounds of formula I in which n represents 9: these estradiol 3-esters 17-(1'-cyclopentadecenyl) ethers are also new and display interesting pharmacological activity.

The compounds of the invention exhibit a great and prolonged uterotrophic and contraceptive activity, particularly when administered parenterally. Thanks to their good solubility in oil they can be easily administered in a single dose to obtain prolonged activity.

Said products can usefully be used to induce estrogenic and contraceptive effects in warm blooded animals.

In accordance with the invention the novel compositions having prolonged contraceptive and estrogenic activity contain as active ingredients the compounds of the invention in admixture with an inert pharmaceutical carrier, in particular an oily solvent, such as, for example, sesame oil, peanut oil, corn oil, coconut oil, cottonseed oil, linseed oil, olive oil or mono- and diglycerides as well as synthetic triglycerides, that is esters of glycerol with high molecular weight aliphatic acids, either saturated or unsaturated. Such compositions may be in form of oily solutions in ampuls or multiple dose flacons containing the active ingredient in an amount of from about 0.1 to about 100 mg., preferably from 0.5 to 20 mg. and may be administered by intramuscular or subcutaneous injections in a single dose.

PHARMACOLOGICAL DATA

A. Determination of the prolonged uterotrophic activity

The compounds under testing in solution of sesame oil were administered subcutaneously in a single dose of 0.05 μmole to spayed rats weighing about 45–50 g. Groups of rats were sacrificed at the end of the 4th and 8th week, respectively, after the administration and the uterus weight of the treated and non-treated animals was determined on a torsion balance. The increase of the uterus weight was considered as an index of the estrogenic activity.

The results obtained are summarized in table I in which the uterotrophic activity of some representative compounds of the invention, i.e. the 17-(1'-cyclooctenyl) ethers of estradiol 3-acetate, 3-isobutyrate and 3-trimethylacetate is compared with that of estradiol 17-enanthate, one of the most long-acting estrogenic agents known so far, and with two lower 17-cycloalkenyl esters already known, i.e. estradiol 3-acetate 17-(1'-cyclopentenyl) ether and estradiol 3-propionate 17-(1'-cyclohexenyl) ether.

TABLE I

| Compounds administered | Uterus weight (mg.) after | |
|---|---|---|
| | 4 weeks | 8 weeks |
| (controls) | 19.5±6.3 | 23.0±1.7 |
| estradiol 17-enanthate | 128.5±5.3 | 104.4±10.5 |
| estradiol 3-acetate 17-(1'-cyclopentenyl) ether | 112.6±16.0 | 94.1±8.8 |
| estradiol 3-propionate 17-(1'-cyclohexenyl) ether | 110.2±17.6 | 71.9±2.8 |
| estradiol 3-acetate 17-(1'-cyclooctenyl) ether | 199.3±9.4 | 121.0±10.6 |
| estradiol 3-trimethylacetate 17-(1'-cyclooctenyl) ether | 181.2±27.1 | 166.8±15.9 |
| estradiol 3-isobutyrate 17-(1'-cyclooctenyl) ether | 194.3±13.8 | 148.9±20.0 |

Table I shows that the compounds according to the invention generally exhibit an estrogenic activity greater and much more prolonged than that of the reference compounds. More particularly, it results that 8 weeks after the treatment the compounds of the invention still possess an uterotrophic activity at least equal to that displayed by estradiol 17-enanthate at the end of the 4th week, while the two known compounds are less active than estradiol 17-enanthate.

B. Determination of the contraceptive activity

The contraceptive activity was determined in mature Wistar female rats weighting about 150–170 g. The compounds under testing, in sesame oil solution, were injected subcutaneously in a single dose of 0.5 μmole and on the next day the treated animals were caged with fertile males and kept therewith till pregnant, and afterwards, on days 15–18 of pregnancy, the females were put in single cages. The results of this investigation are summarized in table II, where it is indicated the situation on the 160th day after the administration.

TABLE II

| | | Number of rats | | | | |
|---|---|---|---|---|---|---|
| | | On day 160 | | | | |
| Compounds administered | Treated (day 0) | Delivered [1] | Miscarried | Killed [2] | Dead | Not pregnant |
| Controls | 10 | 9 (27.6) | | | 1 | |
| Estradiol 3-acetate 17-(1'-cyclooctenyl)ether | 10 | 4 (137.5) | 4 | | 1 | 1 |
| Estradiol 3-trimethylacetate 17-(1'-cyclooctenyl)ether | 10 | 4 (147.5) | | 2 | 1 | 3 |
| Estradiol 3-isobutyrate 17-(1'-cyclooctenyl)ether | 10 | 3 (122.3) | 2 | 1 | 1 | 3 |

[1] In brackets the average number of days from treatment to delivery.
[2] For difficult delivery or probable reabsorption.

Table II shows that, when injected in a single dose of 0.5 μmole the compounds of the invention did not allow any pregnancy for at least 18 weeks, while the controls delivered within 4 weeks.

The novel compounds of this invention may be prepared by reacting a 3-ester derivative of estradiol of formula:

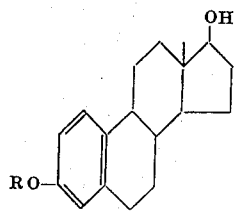

where R has the above defined meaning, with a functional derivative of a cyclic ketone of formula:

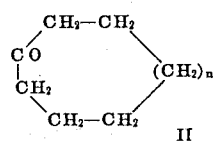

wherein $n$ has the above defined meaning, at a temperature higher than 70° C. The term "functional derivatives" means the typical derivatives of the ketones of formula II above with lower aliphatic alcohols. Such derivatives are lower alkyl acetals or lower alkyl enol ethers containing from one to three carbon atoms as well as mixtures thereof as obtained by reaction of the free ketone with a lower alkyl orthoformate, the methyl and ethyl enol ethers and/or dimethyl and diethyl acetals being preferred. The reaction is carried out under anhydrous conditions, preferably in the presence of an acid catalyst and in an organic solvent, such as, for example benzene, toluene, xylene or dimethylformamide. After about 1 hour the reaction is over and the final product can be isolated according to usual procedures, for example by neutralizing the catalyst, if any, evaporating the solvent and crystallizing and residue from a suitable solvent.

In order further to illustrate the invention the following examples are given.

EXAMPLE 1

An anhydrous mixture of 2 g. of estradiol 3-trimethylacetate and 20 mg. of p-toluenesulfonic acid in 700 ml. of toluene is treated with 2 ml. of cyclooctanone methyl enol ether and then distilled over a period of about 40 minutes. After addition of several drops of pyridine to neutralize the acid catalyst, the mixture is evaporated in vacuo and the solid residue thus obtained is taken up in methanol and filtered. The product, recrystallized from a methylene chloride-methanol mixture, yields 2.3 g. of estradiol 3-trimethylacetate 17-(1'-cyclooctenyl) ether, melting point 155°–157° C., $[\alpha]_D^{24}$=+56° (dioxane, $c$=0.5 percent).

In the same manner, but using estradiol 3-acetate, estradiol 3-propionate and estradiol 3-isobutyrate as starting materials, estradiol 3-acetate 17-(1'-cyclooctenyl) ether, melting point 118°–120° C., $[\alpha]_D^{24}$ =+64° (dioxane, $c$=0.5 percent), estradiol 3-propionate 17-(1'-cyclooctenyl) ether, melting point 80°–82 C., $[\alpha]_D^{24}$=+61° (dioxane, $c$=0.5 percent), and estradiol 3-isobutyrate 17-(1'-cyclooctenyl) ether, melting point 131°–133° C., $[\alpha]_D^{24}$=+57° (dioxane, $c$=0.5 percent) are obtained, respectively.

Analogously using as cyclic ketone a mixture of methyl enol ether and dimethylacetal of exaltone (cyclopentadecanone) the corresponding estradiol 3-esters 17-(1'-cyclopentadecanone) ether are obtained.

EXAMPLE 2

An anhydrous mixture of 2 g. of estradiol 3-propionate, 3 ml. of cycloheptanone dimethyl acetal, 20 mg. of pyridine tosylate and 700 ml. of toluene is distilled over a period of about 40 minutes. The acid catalyst is then neutralized with several drops of pyridine and the mixture is concentrated in vacuo to dryness. The residue taken up in a methylene chloride-methanol mixture yields the estradiol 3-propionate 17-(1'-cycloheptenyl) ether.

EXAMPLE 3

An anhydrous mixture of 2 g. of estradiol 3-propionate and 20 mg. of p-toluenesulfonic acid in 700 ml. of toluene is treated with 2 ml. of cyclododecanone dimethyl acetal and then distilled over a period of about 40 minutes. By operating as in example 1, estradiol 3-propionate 17-(1'-cyclododecenyl) ether is obtained, melting point 117°–119° C., $[\alpha]_D^{24}$= +56.7° (dioxane, $c$=0.5 percent).

In the same manner, but using estradiol 3-enanthate and estradiol 3-caprylate as starting materials, estradiol 3-enanthate 17-(1'-cyclododecenyl) ETHER AND ESTRADIOL 3-caprylate 17-(1'-cyclododecenyl) ether are obtained, respectively.

EXAMPLE 4

Five hundred milligrams of estradiol 3-trimethylacetate 17-(1'-cyclooctenyl) ether is dissolved in 100 ml. of sesame oil and the solution is poured into 1 ml. ampuls so that each ampul contains 5 mg./ml. of the active substance.

EXAMPLE 5

A solution of 200 mg. of estradiol 3-isobutyrate 17-(1'-cyclododecenyl) ether in 100 ml. of sesame oil is poured into 1 ml. ampuls to obtain ampuls containing 2 mg./ml. of the active substance.

We claim:

1. A compound of the formula:

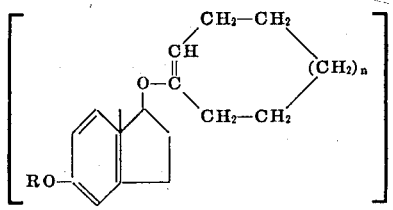

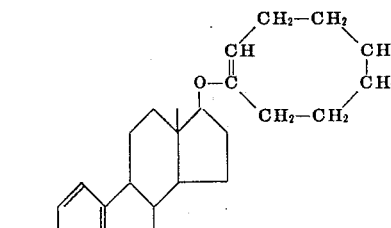

wherein R is an alkanoyl group containing two to five carbon atoms.

2. Estradiol 3-trimethylacetate 17-(1'-cyclooctenyl) ether.
3. Estradiol 3-isobutyrate 17-(1'-cyclooctenyl) ether.
4. Estradiol 3-propionate 17-(1'-cyclooctenyl) ether.
5. Estradiol 3-acetate 17-(1'-cyclooctenyl) ether.

* * * * *

UNITED STATES PATENT OFFICE
CERTIFICATE OF CORRECTION

Patent No. 3,624,113  Dated 11/30/71

Inventor(s) Alberto Ercoli, Rinaldo Gardi, and Romano Vitali

It is certified that error appears in the above-identified patent and that said Letters Patent are hereby corrected as shown below:

Column 4, Claim 1, lines 44-52, the formula appearing in brackets should be deleted:

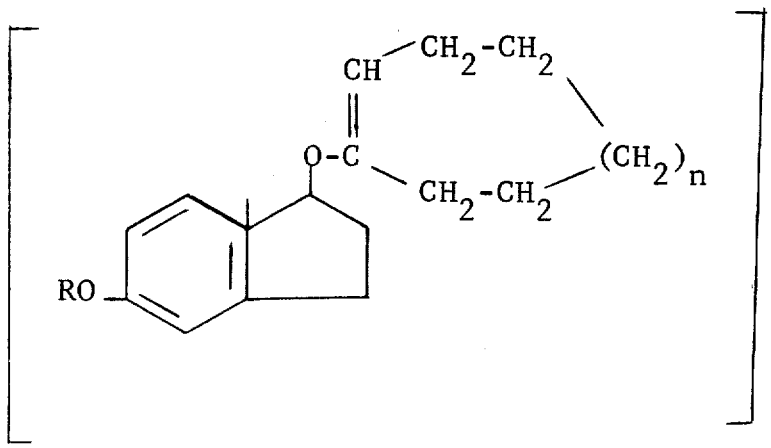

Signed and sealed this 20th day of June 1972.

(SEAL)
Attest:

EDWARD M. FLETCHER, JR.
Attesting Officer

ROBERT GOTTSCHALK
Commissioner of Patents